United States Patent
Szurpicki et al.

(10) Patent No.: US 10,399,521 B2
(45) Date of Patent: Sep. 3, 2019

(54) BUMPER ASSEMBLY FOR A WORK VEHICLE

(71) Applicant: CNH Industrial America LLC, New Holland, PA (US)

(72) Inventors: Paul Francis Szurpicki, Colwich, KS (US); Timothy Aaron Newlin, Wichita, KS (US); Tyler Wade Demel, Wichita, KS (US); Jeremy Mirarck, Wichita, KS (US)

(73) Assignee: CNH Industrial America LLC, New Holland, PA (US)

( * ) Notice: Subject to any disclaimer, the term of this patent is extended or adjusted under 35 U.S.C. 154(b) by 164 days.

(21) Appl. No.: 15/437,235

(22) Filed: Feb. 20, 2017

(65) Prior Publication Data
US 2018/0236955 A1   Aug. 23, 2018

(51) Int. Cl.
*E02F 3/04*  (2006.01)
*B60R 19/38*  (2006.01)
*B62D 55/00*  (2006.01)

(52) U.S. Cl.
CPC .............. *B60R 19/38* (2013.01); *B62D 55/00* (2013.01)

(58) Field of Classification Search
CPC ................................. B60R 19/38; B62D 55/00
USPC ...... 280/416.1, 416.2, 455.1, 492, 500, 502, 280/505, 508
See application file for complete search history.

(56) References Cited

U.S. PATENT DOCUMENTS

| | | | |
|---|---|---|---|
| 2,993,721 A | 7/1961 | Bowman | |
| 3,680,651 A | 8/1972 | Termont | |
| 4,068,876 A | 1/1978 | Muellner | |
| 4,097,085 A | 6/1978 | Nelson | |
| 4,142,642 A | 3/1979 | Myers | |
| 4,580,811 A | 4/1986 | Wykhuis et al. | |
| 4,640,365 A * | 2/1987 | Schmidt | A01B 69/004 104/244.1 |
| 4,692,086 A | 9/1987 | Morita et al. | |
| 5,036,608 A * | 8/1991 | Ciula | E01H 5/066 172/273 |
| 6,089,328 A * | 7/2000 | Moore | A01B 59/068 172/439 |
| 6,230,817 B1 * | 5/2001 | Haugen | A01B 59/068 172/439 |

(Continued)

FOREIGN PATENT DOCUMENTS

JP    H10183687 A    7/1998
WO    2009098011 A1    8/2009

OTHER PUBLICATIONS

Aarow Material Handling Products; PTO Adapters for Skid Steer Loaders; http://www.arrowmhp.com/ptoadapters.php; last accessed Feb. 23, 2017.

(Continued)

*Primary Examiner* — Toan C To
(74) *Attorney, Agent, or Firm* — Peter K. Zacharias; Patrick M. Sheldrake

(57) ABSTRACT

A bumper assembly includes a bumper that has a body and a mounting feature. In addition, a recess extends substantially through at least a portion of the body and the recess is configured to receive a mounting end of an element. In addition, the mounting feature is configured to rotatably couple the element to the body at the mounting end while the mounting end is disposed within the recess.

18 Claims, 7 Drawing Sheets

(56) References Cited

U.S. PATENT DOCUMENTS

| | | | |
|---|---|---|---|
| 6,234,508 B1 * | 5/2001 | Tuttle | A01B 59/004 280/406.1 |
| 6,732,811 B1 * | 5/2004 | Elliott | E01H 5/06 172/445.1 |
| 7,063,169 B2 * | 6/2006 | Elliott | A01B 59/068 172/445.1 |
| 7,707,753 B2 * | 5/2010 | Schmeichel | E01H 5/06 172/811 |
| 7,841,423 B2 | 11/2010 | Damm et al. | |
| 8,752,855 B2 * | 6/2014 | Dilworth | A01B 59/064 280/481 |
| 2005/0095104 A1 * | 5/2005 | Bay | A01B 59/042 414/500 |
| 2011/0260477 A1 * | 10/2011 | Martin | B60R 19/38 293/118 |
| 2016/0040395 A1 * | 2/2016 | Swanson | E02F 9/2267 172/667 |

OTHER PUBLICATIONS

Skidsteers; 3-Point Hitch Adapter Skid Steer Attachment; http://www.skidsteers.com/3-point-adapter-attachment.html; last accessed Feb. 23, 2017.

* cited by examiner

BUMPER ASSEMBLY FOR A WORK VEHICLE

BACKGROUND

The present disclosure relates generally to a bumper assembly for a work vehicle.

Certain work vehicles (e.g., tractors, motor grader, skid steers, utility vehicle, etc.) include a bumper assembly to protect a chassis and/or a cab of the work vehicle from impacts. In addition, work vehicles often include mounting assemblies configure to couple tools (e.g. a ripper, a mower, etc.) to the work vehicle to complete certain tasks (e.g. tilling, ground working, mowing, etc.). Unfortunately, certain bumper assemblies block access to certain mounting assemblies. Accordingly, the bumper may be removed to facilitate attachment of the tool, thereby increasing the duration associated with reconfiguring a work vehicle.

BRIEF DESCRIPTION

In one embodiment, a bumper assembly includes a bumper that has a body and a mounting feature. In addition, a recess extends substantially along a vertical axis through at least a portion of the body and the recess is configured to receive a mounting end of a rotatable element. In addition, the mounting feature is configured to rotatably couple the rotatable element to the body at the mounting end while the mounting end is disposed within the recess.

In another embodiment, a bumper assembly includes a bumper that has a body and multiple mounting features. In addition, multiple recesses in the body are spaced apart from one another along a lateral axis and each of the multiple recesses extends substantially along a vertical axis through at least a portion of the body and each of the multiple recesses is configured to receive a mounting end of a respective rotatable element. In addition, each of the multiple mounting features is configured to rotatably couple the respective rotatable element to the body at the mounting end while the mounting end is disposed within a respective recess of the multiple recesses. Further, the bumper assembly includes multiple vertical supports extending upwardly from the body substantially along the vertical axis and spaced apart from one another along the lateral axis.

In a further embodiment, a bumper assembly includes a bumper that has a body and two mounting features. In addition, two recesses in the body are spaced apart from one another along a lateral axis and each of the two recesses extends substantially along a vertical axis through at least a portion of the body. Each of the two recesses is configured to receive a respective mount of a rotatable platform and to receive a mounting end of a respective arm of a hitch assembly. In addition, each of the mounting features is configured to rotatably couple the rotatable platform to the body at the respective mount while the respective mount is disposed within a respective recess of the two recesses and to rotatably couple the respective arm of the hitch assembly to the body at the mounting end while the mounting end is disposed within the respective recess.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
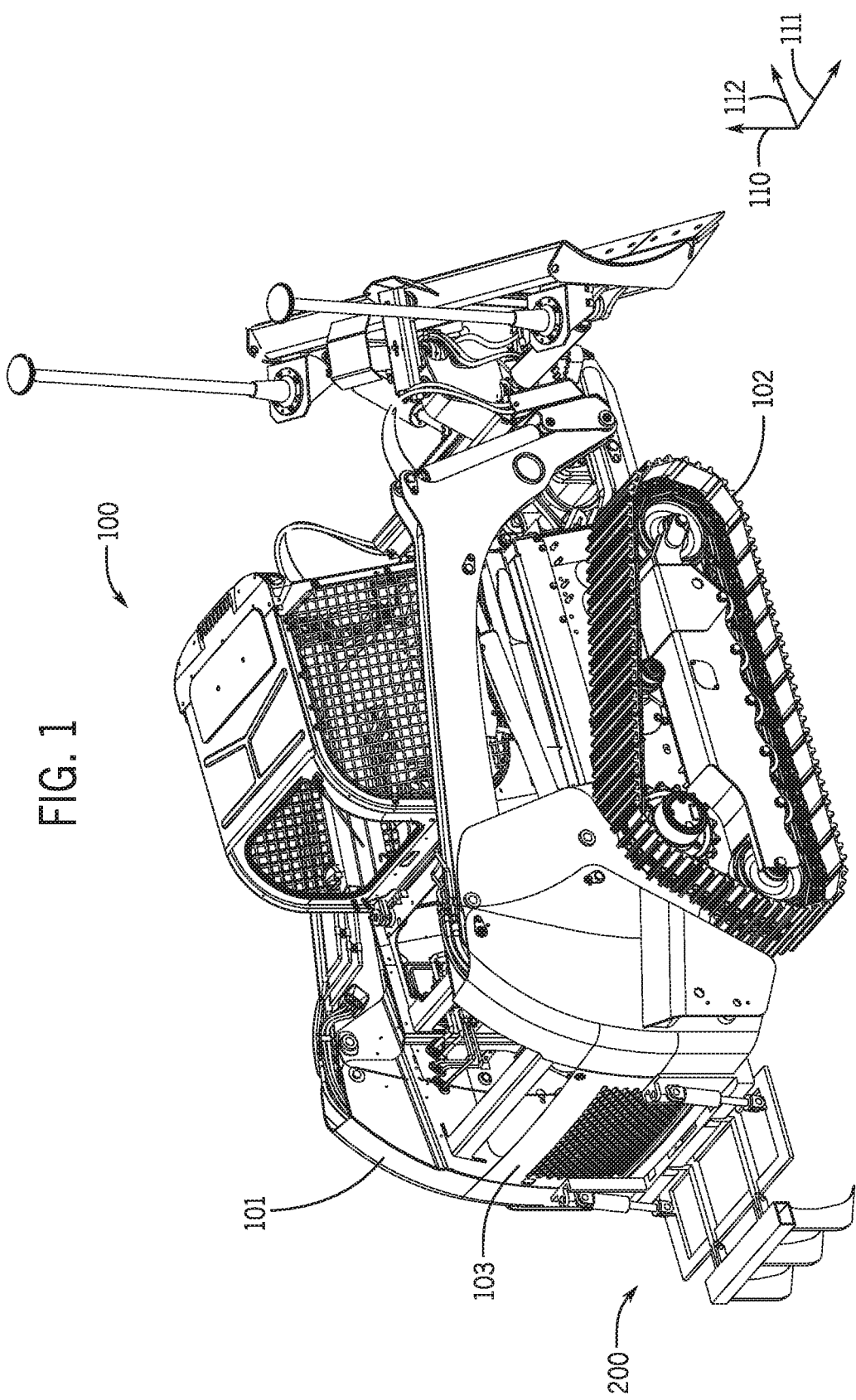
FIG. 1 is a perspective view of an embodiment of a work vehicle that includes an embodiment of a bumper assembly.

Turning to the drawings, FIG. 1 is a perspective view of an embodiment of a work vehicle 100 that includes an embodiment of a bumper assembly. In the illustrated embodiment, the work vehicle 100 is a compact track loader. However, it should be appreciated that the bumper assembly disclosed herein may be utilized on other work vehicles, such as on-road trucks, skid steers, tractors, harvesters, and construction equipment, among other work vehicles. In the illustrated embodiment, the work vehicle 100 includes a chassis 101. In certain embodiments, the chassis 101 is configured to house a motor (e.g., diesel engine, etc.), a hydraulic system (e.g., including a pump, valves, reservoir, etc.), and other components (e.g., an electrical system, a cooling system, etc.) that facilitate operation of the work vehicle. Chassis 101 also includes a rear door 103 that may be opened or closed and facilitates access to the interior of the chassis for maintenance purposes. In addition, the chassis 101 is configured to support a cab and tracks 102. The tracks 102 may be driven to rotate by the motor and/or by component(s) of the hydraulic system (e.g., hydraulic motor(s), etc.). While the illustrated work vehicle 100 includes tracks 102, it should be appreciated that in alternative embodiments, the work vehicle may include wheels or a combination of tracks and wheels.

As discussed in detail below, the work vehicle 100 includes a bumper assembly 200 configured to protect the chassis 101 from impacts, and the bumper acts as a ballast to increase the stability of the chassis 101. In addition, the bumper assembly includes mounting features that enable different types of tools (e.g. a ripper, a hitch assembly, mower, etc.) to be coupled to the work vehicle 100. For example, in the illustrated embodiment, the bumper assembly 200 includes mounting features that enable two arms of a hitch assembly to couple to the bumper assembly. The bumper assembly 200 further includes vertical supports that include additional mounting features for hydraulic cylinders and/or for a support bar that may include a mounting feature for a third arm of the hitch assembly. The configuration of mounting features may enable a large variety of tools (e.g. ripper, hitch assembly, mower, etc.) to be mounted to the bumper assembly 200.

Figure 2:
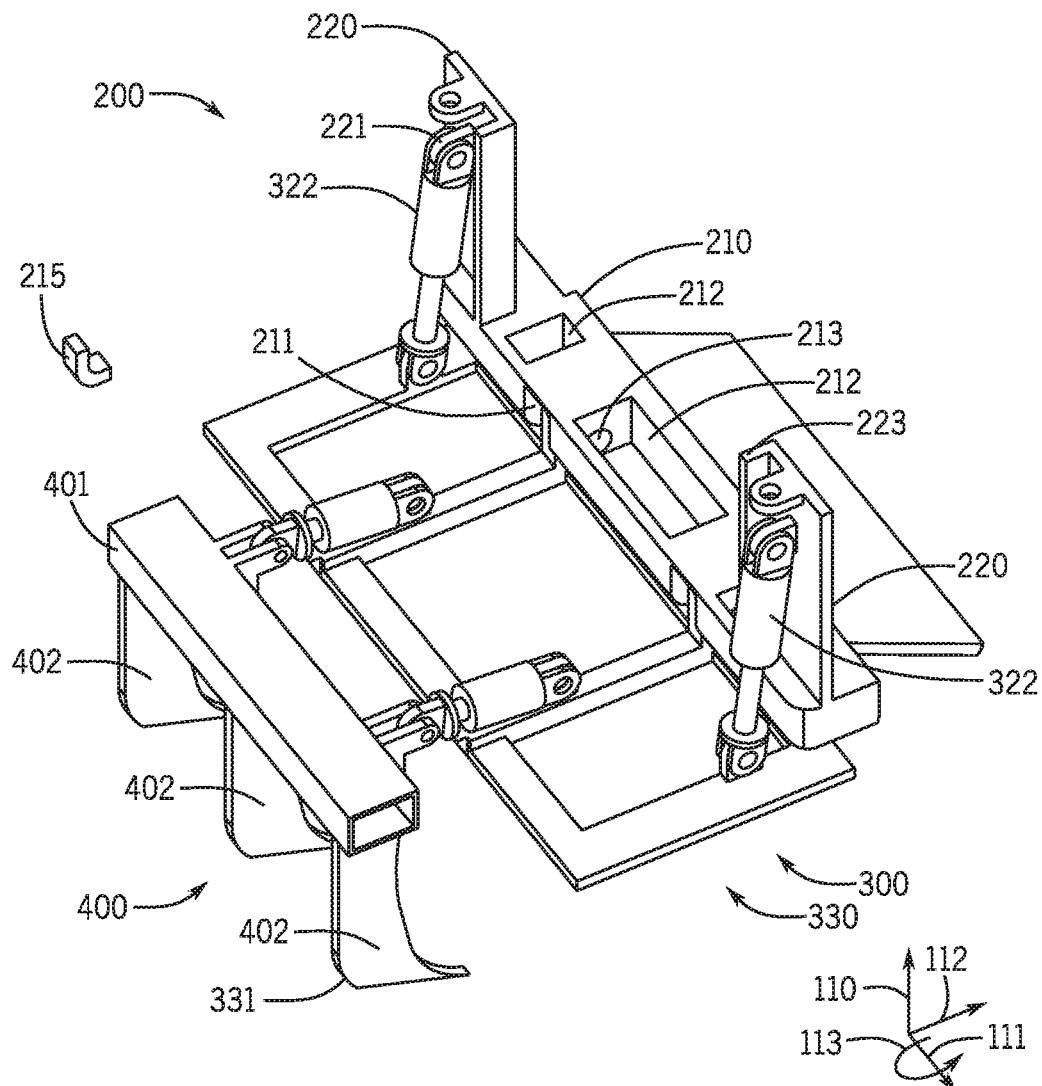
FIG. 2 is a perspective view of the bumper assembly of FIG. 1.

FIG. 2 is a perspective view of the bumper assembly 200 of FIG. 1. In the illustrated embodiment, the bumper assembly 200 includes a bumper 210. The bumper 210 includes recesses 211 that extend substantially along a vertical axis 110, and facilitate attachment of certain tools to the bumper 210. The bumper 210 includes two recesses 211 separated from one another along a lateral axis 111. It should be appreciated that the recesses may be located in any suitable position along the bumper 210, and the bumper 210 may include any suitable number of recesses (e.g., 1, 2, 3, 4, 5, 6, or more). The bumper 210 also includes openings 212 to facilitate access to mounting features, such as the apertures 213. While the illustrated bumper 210 includes an opening 212 on each lateral side of the recesses 211 and an opening laterally between the recesses 211, it should be appreciated that the openings may be positioned in any suitable arrangement that facilitates access to the apertures 213. In the present embodiment, the bumper 210 includes a covers 215 that cover the recesses 211 so that access to the recesses 211 are blocked while the covers are positioned over or within the openings 212 and/or recesses 211. Further, it should be appreciated that covers 215 could be configured to cover openings 212. The covers are configured to keep dirt and/or debris out of the openings 212 and/or recesses 211 when no tool is mounted to the bumper 210.

In the present embodiment, the bumper assembly 200 includes vertical supports 220 that extend upwardly from the bumper 210 substantially along the vertical axis 110. While the present embodiment includes two vertical supports 220, it should be appreciated that there may be any suitable number of vertical supports 220 extending from the bumper 210 (e.g. 0, 1, 2, 3, 4, 5, 6, or more) in alternative embodiments. Each vertical support 220 includes a respective first mount 221. In the present embodiment, the mounts 221 are configured to rotatably couple hydraulic cylinders 322 of a platform assembly 300 to the vertical supports 220. Hydraulic cylinders 322 also rotatably couple to a rotatable platform 330 of the platform assembly 300. The rotatable platform 330 is also rotatably coupled to the bumper 210 at the apertures 213 by mounts of the rotatable platform 330 disposed within the recesses 211. The mounts of the rotatable platform 330 are coupled to the apertures 213 by any suitable fastener (e.g. bolts, pins, etc.). It should be appreciated that the hydraulic cylinders 322 may be coupled to other attachments (e.g. arms coupled to mounts of vertical supports, etc.) in other embodiments. Further, any suitable number of hydraulic cylinders may be included and coupled to a corresponding number of mounts 221 (e.g. 1, 2, 3, 4, 5, 6, or more). In the illustrated embodiment, the platform 330 is configured to couple a ripper assembly 400 to the bumper assembly 200; however, it is also imagined the platform could be used to mount a mower, a tilling assembly, etc. In the present embodiment, the ripper assembly 400 includes a mounting bar 401 and ripper blades 402. The mounting bar 401 of the ripper assembly 400 rotatably couples to the platform 330. The ripper blades 402 are rigidly coupled to the mounting bar 401, and the ripper blades 402 are configured to rip a path in the ground as they pass through the ground.

Figure 3:
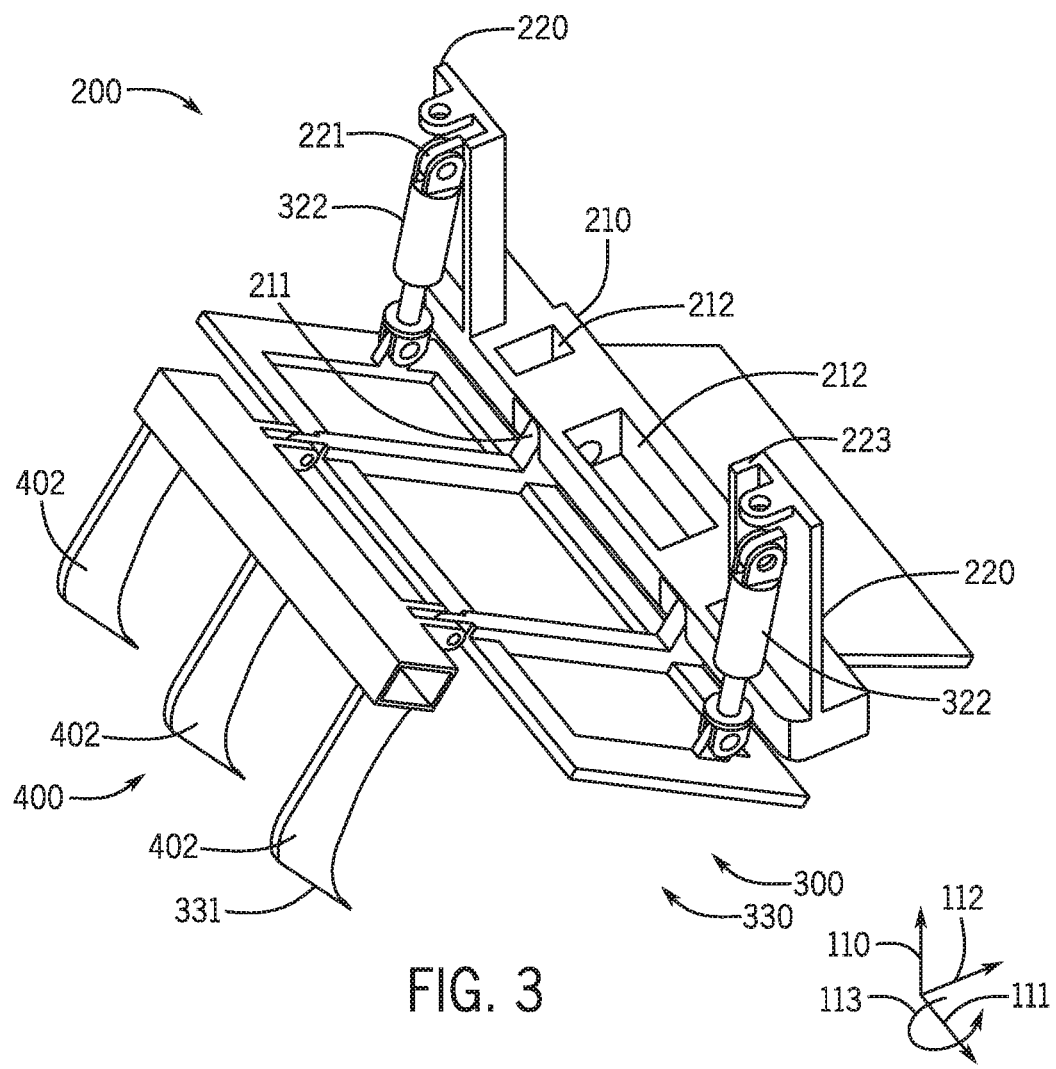
FIG. 3 is a perspective view of the bumper assembly of FIG. 2, in which hydraulic cylinders are retracted.

FIG. 2 includes the rotatable platform 330 in a working position, in which the hydraulic cylinders 322 are extended. In the working position, the platform 330 is substantially parallel to the ground and the ripper blades 402 are engaged with the ground. FIG. 3 is a perspective view of the bumper assembly of FIG. 2, in which the hydraulic cylinders are retracted. As illustrated, the rotatable platform 330 is rotated to a raised position such that the ripper blades 402 disengage the ground. In the illustrated embodiment, the rotatable platform 330 rotates about the fasteners that are coupled to the apertures 213 along the lateral axis 111 in pitch 113. Further, the rotatable platform 330 extends away from the bumper assembly 200, opposite a direction of travel 112, and the platform 330 extends along the direction of travel 112.

Figure 4:
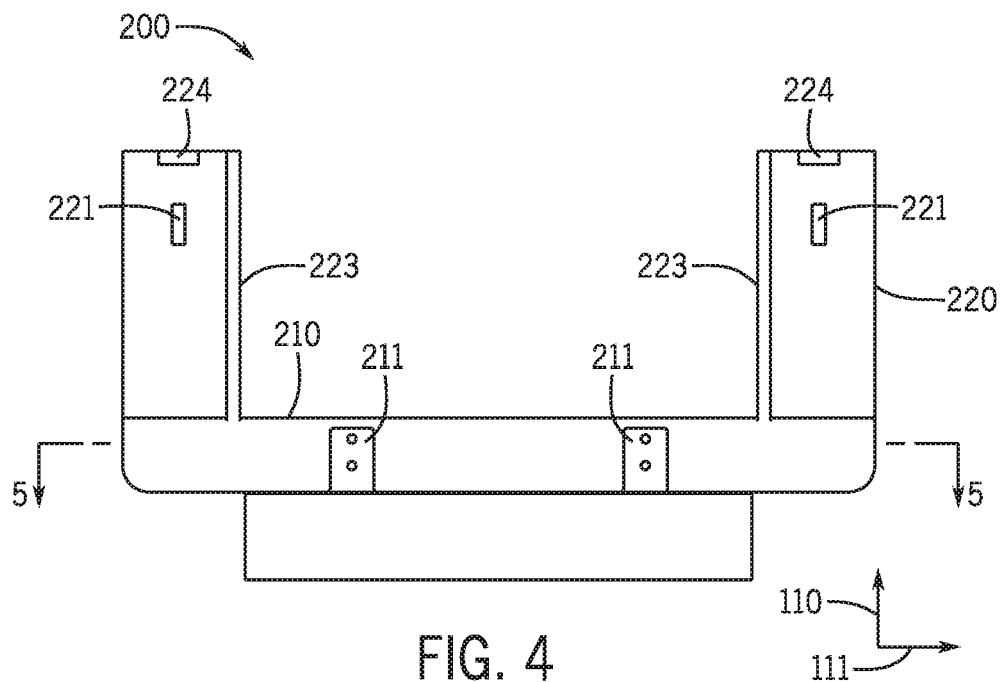
FIG. 4 is a rear view of the bumper assembly of FIG. 2.

FIG. 4 is a rear view of the bumper assembly 200 of FIG. 2. As illustrated, the bumper assembly 200 includes the recesses 211, the vertical supports 220, and the first mounts 221. In addition, the bumper assembly 200 includes a lip 223 extending along each vertical support 220, and a support bar mount 224 extending from each vertical support 220. As discussed above, the recesses 211 extend vertically through a portion of the bumper 210 and are separated from one another along the lateral axis 111. It should be noted, that the recesses may extend through any suitable portion of the bumper 210, including 25%, 50%, 75%, or 100%. In addition, the vertical supports 220 extend substantially vertically from the bumper 210; however, it should be appreciated that the recesses may extend at any suitable angle through the bumper. Each lip 223 is disposed on a laterally inward edge of a respective vertical support 220. Also, while the illustrated embodiment includes a lip 223 on the laterally inward edge of each vertical support 220, it should be appreciated that lips may be disposed on any or all edges of one or both vertical supports. The lips 223 may increase the rigidity of the vertical supports 220, and the lips 223 may protect the mounts 221 and 224 from debris, etc. Further, the first mount 221 is oriented along the vertical axis 110 on each vertical support 220, but it should be appreciated that the first mount may be oriented at any suitable angle relative to the axes 110, 111, and 112 and/or at any suitable location on each vertical support. In addition, the support bar mount 224 is oriented along the lateral axis 111 on each vertical support 220, but it should be appreciated that the support bar mount may be oriented at any suitable angle relative to the axes 110, 111, and 112 and/or at any suitable location on each vertical support.

Figure 5:
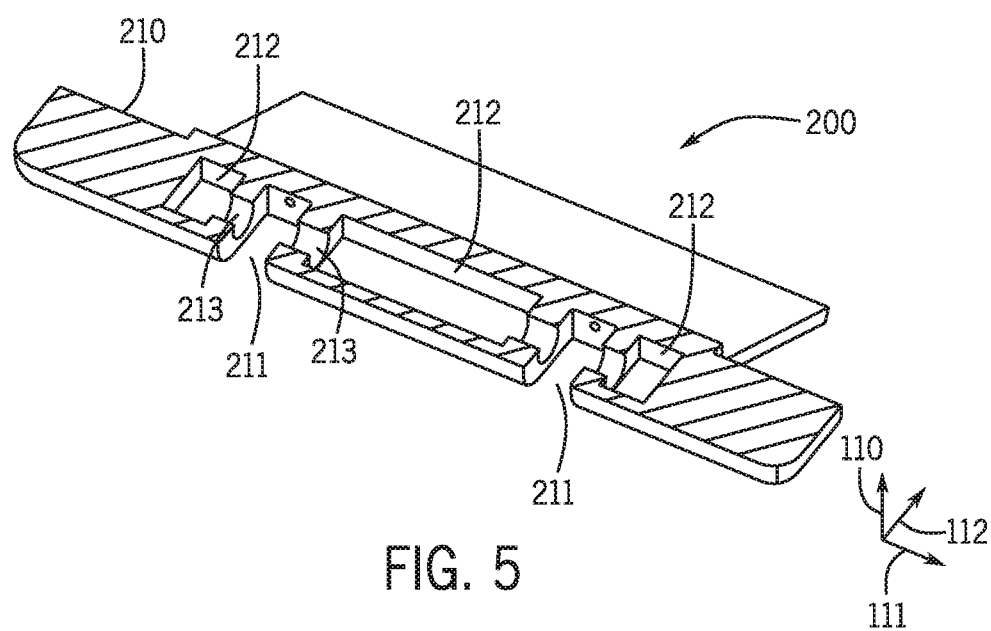
FIG. 5 is a cross-sectional view of a bumper of the bumper assembly of FIG. 2, taken along line 5-5 of FIG. 4.

FIG. 5 is a cross-sectional view of the bumper 210 of the bumper assembly 200 of FIG. 2, taken along line 5-5 of FIG. 4. As discussed above, the recesses 211 extend vertically through a portion of the bumper 210 and are separated from one another along the lateral axis 111. Also, the openings 212 facilitate access to the apertures 213 and are positioned on opposite lateral sides of each recesses 211. The bumper 210 includes mounting features, such as the illustrated apertures 213, configured to rotatably couple (e.g., using a pin, a bolt, a fastener, etc.) the rotatable platform 300 or a hitch assembly to the bumper 210. In the illustrated embodiment, apertures 213 are positioned on opposite lateral sides of each recess 211; however, in an alternative embodiment, only one aperture 213 may be positioned on one lateral side of at least one recess 211. In addition, it should be appreciated that apertures 213 could include other mounting assemblies (e.g. hinge, track, etc.).

Figure 6:
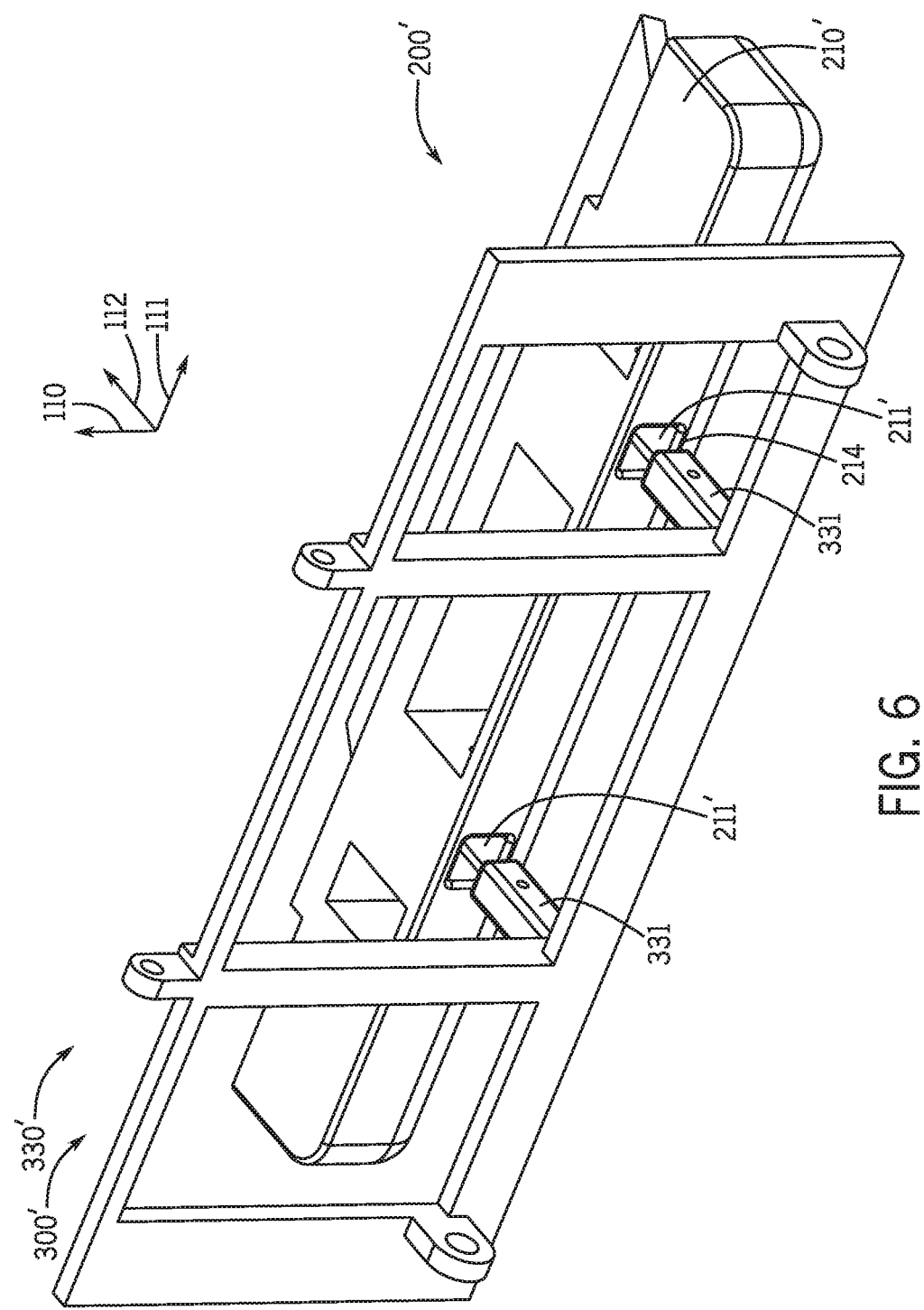
FIG. 6 is a perspective view of the bumper assembly of FIG. 1.

FIG. 6 is a perspective view of an alternative embodiment of the bumper assembly 200' of FIG. 2 having tubular recesses 211'. In the present embodiment, recesses 211' have a bottom surface 214 that is integral with the bumper 210'. In alternative embodiments, the bottom surface 214 may be hinged and rotate downwards so that the recesses 211' may alternate between a tubular recess and an open recess, such as the recesses 211 of FIG. 2. The recesses 211' may receive a mounting end 331 of the platform 330'. The mounting end 331 of the platform 330' substantially non-rotatably couples to the bumper 210' and the platform 330' to one another. The bottom surface 214 of the mounting end 331 interacts with the bottom surface 214, blocking downward rotation of the platform 330'. Further, the left surface blocks leftward rotation of the platform 330', the right surface blocks rightward rotation of the platform 330', and the top surface blocks upward rotation of the platform 330'.

Figure 7:
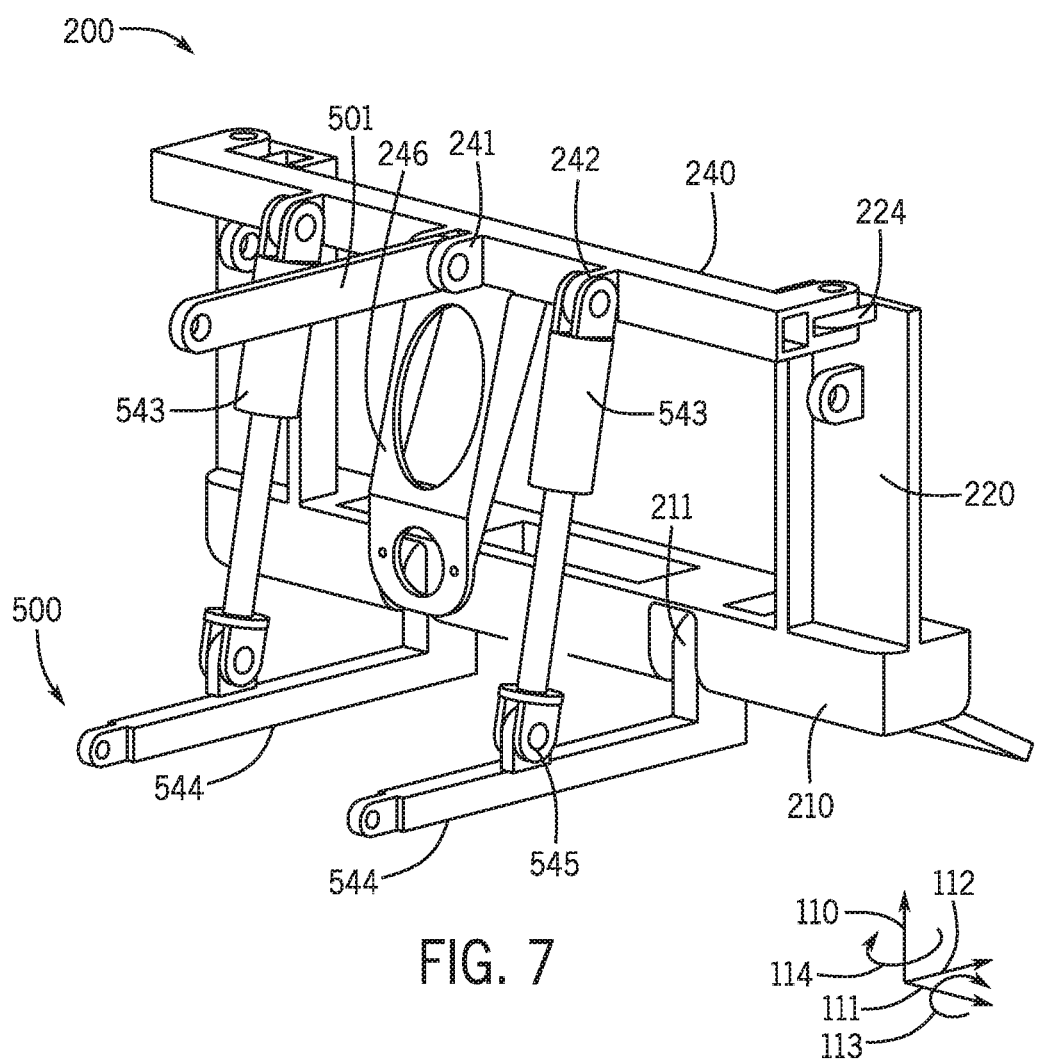
FIG. 7 is a perspective view of the bumper assembly of FIG. 2 in which the bumper assembly includes a hitch assembly support bar and a power take-off drive mount.

FIG. 7 is a perspective view of the bumper assembly 200 of FIG. 2, in which the bumper assembly includes a hitch assembly support bar 240 coupled to the vertical supports 220 and a power take-off drive mount 246 coupled to the hitch assembly support bar 240. The hitch assembly support bar 240 is coupled to the vertical supports 220 at the support bar mounts 224. The hitch assembly support bar 240 may be rotatably coupled to each support bar mount 224 by a pin or other suitable fastener; however, when the hitch assembly support bar is coupled to two support bar mounts, the hitch assembly support bar 240 is fixedly coupled to the vertical supports 220. However, the hitch assembly support bar 240 may rotate when uncoupled from one of the support bar mounts 224. In rotation, the hitch assembly support bar 240 rotates about the support bar mount 224 that the hitch assembly support bar 240 remains rotatably coupled to. In addition, the hitch assembly support bar 240 has mounts 242 configured to rotatably couple hydraulic cylinders 543 to the hitch assembly support bar 240. The hitch assembly support bar 240 also includes a third arm mount 241 configured to couple a third arm 501 of the hitch assembly 500 to the hitch assembly support bar 240. Further, the hitch assembly support bar 240 includes a power take-off drive mount 246, which is configured to support a hydraulic drive; however, the power take-off drive mount 246 may be omitted in alternative embodiments. The apertures 213 rotatably couple two arms 544 of a hitch assembly 500 to the bumper 210, as illustrated in the present embodiment. A mounting end of each arm 544 is disposed within a respective recess 211. In addition, each arm 544 is rotatably coupled to the bumper 210 via a fastener extending through a respective aperture and the mounting end of the respective arm. The arms 544 also include mounts 545 configured to rotatably couple to the hydraulic cylinders 543. As illustrated the hydraulic cylinders 543 are in an extended position. The hydraulic cylinders 543 may retract, causing the arms 544 to rotate about the lateral axis 111 in pitch 113.

It should be noted that the recesses 211, apertures 213, and the support bar mounts 224 enable the bumper assembly 200 to support multiple types of tools, such as the hitch assembly and the platform assembly. For instance, in certain embodiments, to couple the platform assembly 300 to the bumper assembly 200, both arms 544 and hitch assembly support bar 240 may be removed, or, alternatively, only arms 544 may be coupled to the bumper 210 to support a tool. In these embodiments, the hitch assembly support bar 240 may be removed. In certain embodiments, the first mounts 221 may be omitted from the vertical supports 220. In further embodiments, the support bar mounts 224 may be omitted. In other embodiments, the vertical supports 220 may be omitted, and certain features of the vertical supports 220 (e.g., the first mounts, the support bar mounts, etc.) may instead be coupled to the work vehicle 100, such as to the chassis 101.

Figure 8:
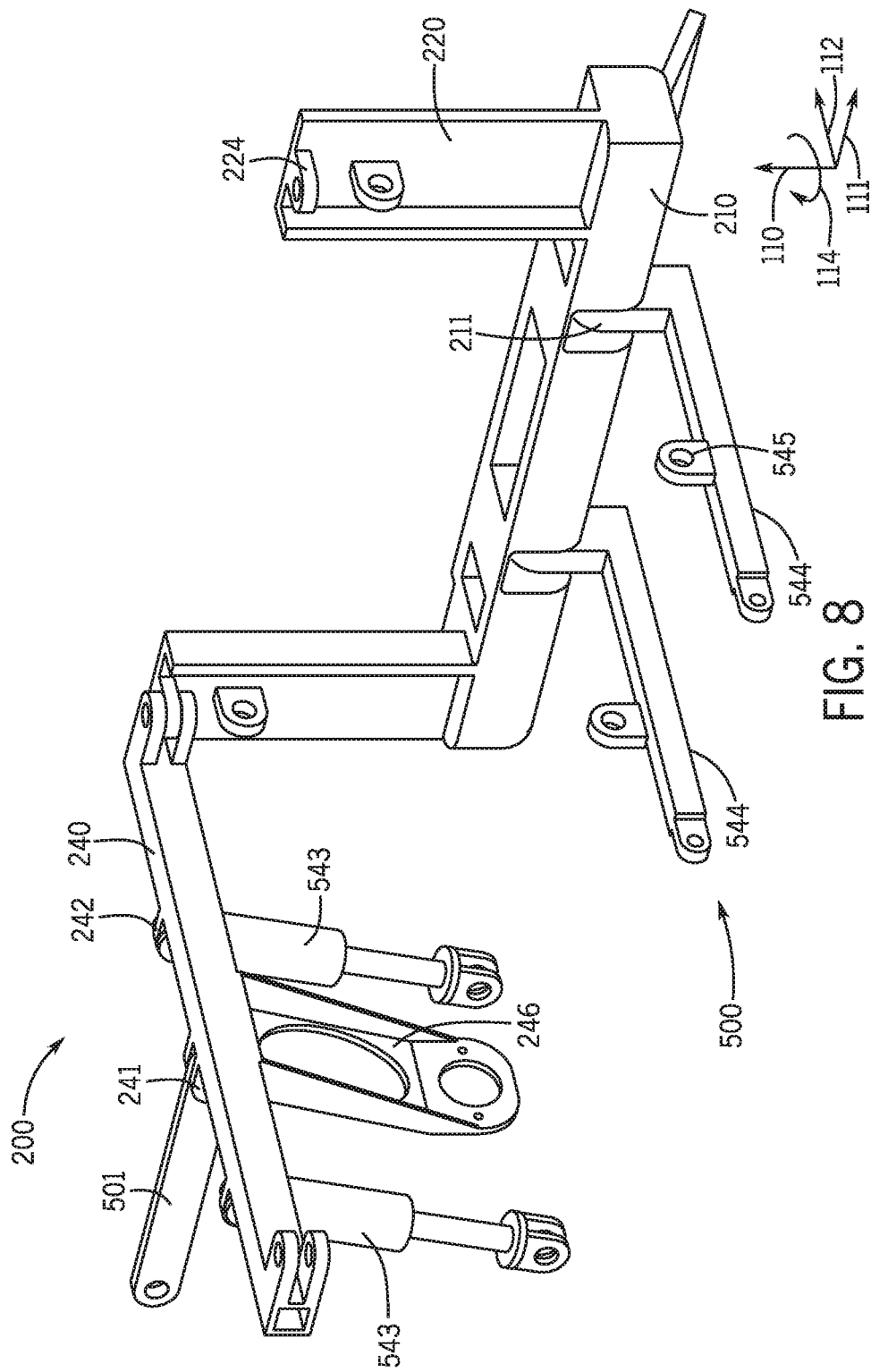
FIG. 8 is a perspective view of the bumper assembly of FIG. 7, in which the hitch assembly support bar is rotated outwardly.

FIG. 8 is a perspective view of the bumper assembly of FIG. 7, in which the hitch assembly support bar 240 is rotated outwardly about a support bar mount 224 in yaw 114. Rotating the hitch assembly support bar 240 to the illustrated position provides a user with more convenient access to the rear of the work vehicle 100 (e.g., to the rear door 103, which may facilitate access to the interior of the chassis for maintenance).

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A bumper assembly for a work vehicle, comprising:
a bumper having a body and a mounting feature, wherein a recess extends substantially along a vertical axis through at least a portion of the body, the recess is configured to receive a mounting end of an element, and the mounting feature is configured to couple the element to the body at the mounting end while the mounting end is disposed within the recess;
wherein the mounting feature comprises an aperture configured to receive a pin that engages the mounting end while the mounting end is disposed within the recess, the body has an opening extending to the aperture, the opening is positioned on an opposite side of the aperture from the recess, the opening is wider than the aperture, and the opening is configured to facilitate access to the aperture.

2. The bumper of claim 1, wherein the opening extends from a top surface of the body.

3. The bumper assembly of claim 1, comprising a vertical support extending upwardly from the body substantially along the vertical axis.

4. The bumper assembly of claim 3, comprising a mount extending from the vertical support.

5. The bumper assembly of claim 3, wherein the vertical support has a lip on a laterally inward end of the vertical support.

6. The bumper assembly of claim 1, comprising a cover configured to couple to the body and to substantially block access to the recess.

7. A bumper assembly for a work vehicle, comprising:
a bumper having a body and a plurality of mounting features, wherein a plurality of recesses in the body are spaced apart from one another along a lateral axis, each of the plurality of recesses extends substantially along a vertical axis through at least a portion of the body, each of the plurality of recesses is configured to receive a mounting end of a respective rotatable element, and each of the plurality of mounting features is configured to rotatably couple the respective rotatable element to the body at the mounting end while the mounting end is disposed within a respective recess of the plurality of recesses; and
a plurality of vertical supports extending upwardly from the body substantially along the vertical axis and spaced apart from one another along the lateral axis.

8. The bumper assembly of claim 7, wherein at least one of the plurality of mounting features comprises an aperture configured to receive a pin.

9. The bumper assembly of claim 7, wherein the body has at least one opening extending to the plurality of mounting features, and the at least one opening is configured to facilitate access to the plurality of mounting features.

10. The bumper assembly of claim 7, comprising a plurality of mounts extending from the plurality of vertical supports.

11. The bumper assembly of claim 7, wherein at least one vertical support of the plurality of vertical supports has a lip on a laterally inward end of the at least one vertical support.

12. The bumper assembly of claim 7, comprising a plurality of covers configured to couple to the body and to substantially block access to the plurality of recesses.

13. A bumper assembly for a work vehicle, comprising:
a bumper having a body and two mounting features, wherein two recesses in the body are spaced apart from one another along a lateral axis, each of the two recesses extends substantially along a vertical axis through at least a portion of the body, each of the two recesses is configured to receive a respective mount of a rotatable platform and to receive a mounting end of a respective arm of a hitch assembly, and each of the mounting features is configured to rotatably couple the rotatable platform to the body at the respective mount while the respective mount is disposed within a respective recess of the two recesses and to rotatably couple the respective arm of the hitch assembly to the body at the mounting end while the mounting end is disposed within the respective recess.

14. The bumper assembly of claim 13, comprising two vertical supports extending upwardly from the body substantially along the vertical axis and space apart from one another along the lateral axis.

15. The bumper assembly of claim 14, wherein each vertical support of the two vertical supports comprises a first mount configured to receive a mounting feature of a hydraulic cylinder.

16. The bumper assembly of claim 14, wherein each vertical support of the two vertical supports comprises a second support bar mount configured to rotatably couple to a mounting feature a hitch assembly support bar.

17. The bumper assembly of claim 16, comprising the hitch assembly support bar, wherein the hitch assembly support bar comprises a third mount configured to rotatably couple to a third arm of the hitch assembly.

18. The bumper assembly of claim 17, wherein the hitch assembly support bar comprises a power take-off drive mount extending downwardly from the hitch assembly support bar substantially along the vertical axis, and the power take-off drive mount is configured to couple a power take-off drive to the hitch assembly support bar.

* * * * *